United States Patent
Allison, III et al.

(10) Patent No.: US 9,369,497 B1
(45) Date of Patent: Jun. 14, 2016

(54) COMMUNICATIONS SYSTEM AND RELATED METHOD FOR ROUTING CALLS TO A DIFFERENT DESTINATION

(75) Inventors: Jones E. Allison, III, Madison, AL (US); Jason Amos, Albertville, AL (US); Coleman D. Bagwell, Madison, AL (US); Daniel Weatherford, Toney, AL (US)

(73) Assignee: Adtran, Inc., Huntsville, AL (US)

( * ) Notice: Subject to any disclaimer, the term of this patent is extended or adjusted under 35 U.S.C. 154(b) by 786 days.

(21) Appl. No.: 12/774,744

(22) Filed: May 6, 2010

(51) Int. Cl.
*H04L 29/06* (2006.01)
*H04L 12/46* (2006.01)
*H04M 5/00* (2006.01)

(52) U.S. Cl.
CPC ......... *H04L 65/1006* (2013.01); *H04L 65/1083* (2013.01)

(58) Field of Classification Search
CPC ....................... H04L 65/1006; H04L 65/1083
USPC ........................................................ 370/270
See application file for complete search history.

(56) References Cited

U.S. PATENT DOCUMENTS

| | | | |
|---|---|---|---|
| 7,076,048 B2 | 7/2006 | Lee et al. | 379/265.01 |
| 7,185,094 B2 | 2/2007 | Marquette et al. | 709/225 |
| 2002/0143874 A1* | 10/2002 | Marquette et al. | 709/204 |
| 2005/0243870 A1* | 11/2005 | Balogh | H04W 36/0022 370/522 |
| 2006/0050658 A1* | 3/2006 | Shaffer | H04M 3/5166 370/261 |
| 2006/0065709 A1* | 3/2006 | Yamashita | H04M 1/72533 235/375 |
| 2006/0251232 A1* | 11/2006 | Wuthnow et al. | 379/201.01 |
| 2007/0263802 A1 | 11/2007 | Allen | 379/93.01 |
| 2008/0010380 A1 | 1/2008 | Whitehead et al. | 709/227 |
| 2008/0089324 A1* | 4/2008 | Polk | H04L 65/608 370/389 |
| 2009/0003322 A1* | 1/2009 | Isumi | 370/352 |
| 2009/0113067 A1 | 4/2009 | Andreasen | 709/231 |
| 2009/0252049 A1* | 10/2009 | Ludwig | H04W 28/24 370/252 |
| 2009/0285203 A1* | 11/2009 | Ress et al. | 370/352 |
| 2011/0182285 A1* | 7/2011 | Bajko et al. | 370/352 |

* cited by examiner

*Primary Examiner* — Asad Nawaz
*Assistant Examiner* — Jason Harley
(74) *Attorney, Agent, or Firm* — Fish & Richardson P.C.

(57) ABSTRACT

A communications session call is established between first and second call devices. A SIP Reinvite command is sent to the second call device without any SDP media parameters to gain new and current media parameters. The second call device acknowledges the Reinvite command as corresponding to the first SDP offer with new and current media parameters. A third call device is sent a SIP Reinvite command as a second SDP offer using new and current media parameters. The third call device acknowledges the SIP Reinvite command as corresponding to the first SDP answer to the first SDP offer. The second call device acknowledges as a second SDP answer to the second SDP offer. The call with the first call device is terminated to change the destination of the call and maintaining any media stream between the second and third call devices.

22 Claims, 3 Drawing Sheets

COMMUNICATIONS SYSTEM AND RELATED METHOD FOR ROUTING CALLS TO A DIFFERENT DESTINATION

FIELD OF THE INVENTION

This invention relates to communications systems, and more particularly, this invention relates to routing calls to different destinations.

BACKGROUND OF THE INVENTION

The Request For Comments (RFC) 3264, the disclosure which is hereby incorporated by reference in its entirety, describes the offer-answer model by which two entities can make use of the Session Description Protocol (SDP) to arrive at a common view of a multimedia session between them. In an Internet Protocol (IP) communications system such as the Session Initiation Protocol (SIP) communications, this offer-answer model must be adhered to when changing the destination of a routed call while maintaining media end-to-end without switched processing or terminating and resending the media at any time during the call to conserve wire and processing bandwidth. Many current network switches reuse the originally sent media parameters, which may no longer be valid on the connection or may not provide the best bandwidth solution. This can have drawbacks not only in different types of call forking applications, but also with call progress tones applications. RFC 3725, the disclosure which is hereby incorporated by reference in its entirety, discloses some call flows that use an invite with no SDP.

SUMMARY OF THE INVENTION

In accordance with a non-limiting example, the system and method allows call devices or other network devices such as Session Initiation Protocol (SIP) phones and an analog phone as a non-limiting example to participate in call forking, for example, as a ring group type application, with correct media after finding an answering party. The system and method allows for a SIP connection using any means to have a connected call with full media to be routed to another endpoint without SIP transfer methods not allowed on the wire. The system and method also allows for provision of ring-back on calls that were previously connected that have been redirected to a new endpoint without the use of SIP transfer methods and patch-up of the audio after the new endpoint connects.

The system and method, in accordance with a non-limiting example, solves these problems using a mechanism to reestablish media negotiation. In one aspect, it is referred to as a double (Invite) Reinvite and in effect will query or send an Invite (Reinvite) to one endpoint of a call with no SDP (Session Description Protocol), thus, gaining new and current media parameters for an official offer in a new Reinvite to the second endpoint of a call. Once the answer from the second endpoint to the current offer is received, the system and method sends the response to the first endpoint in the acknowledgement (ACK). The system uses a standard SIP message characteristics to implement and avoid violations of RFC 3264 while not processing media. This system and method can be automatically invoked on all transfers and forwards within a device and manually provides a ring-back connection to the local media, which in one example is a Digital Signal Processor (DSP), but could be any source.

In accordance with a non-limiting example, a system and method routes a call and establishes a SIP communications session call between a first call device and second call device. A SIP Reinvite command is sent to the second call device without any SDP media parameters to gain new and current media parameters. The second call device acknowledges the Reinvite command as corresponding to the first SDP offer with new and current media parameters. A third call device sends a SIP Reinvite command as a second SDP offer using new and current media parameters. The third call device acknowledges the SIP Reinvite command as corresponding to the first SDP answer to the first SDP offer. The second call device acknowledges as a second SDP answer to the second SDP offer. The call with the first call device is terminated for changing the destination of the call and maintaining any media stream between the second and third call devices.

In another example, a call control agent is used for establishing calls between the various call devices, which in another example, are arranged in call progress tones applications, such as a ring group application. The call control agent is formed as a communications server in an example and operative as a network switching device.

In another example, the destination of the call is changed and the media stream maintained between the second and third call devices without violating the offer-answer model of negotiation using SDP. In another example, the destination of the call is changed and any media stream is maintained between the second and third call device without any interaction from the first call device. The third call device in an example is a media server. In yet another example, a ring-back is allowed on calls that were previously connected that had been redirected to a new endpoint as a third call device without use of SIP transfer methods and patch-up of audio after the new endpoint connects. At least one of the call devices is an analog phone in an example and the other call device is a SIP phone in another example.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
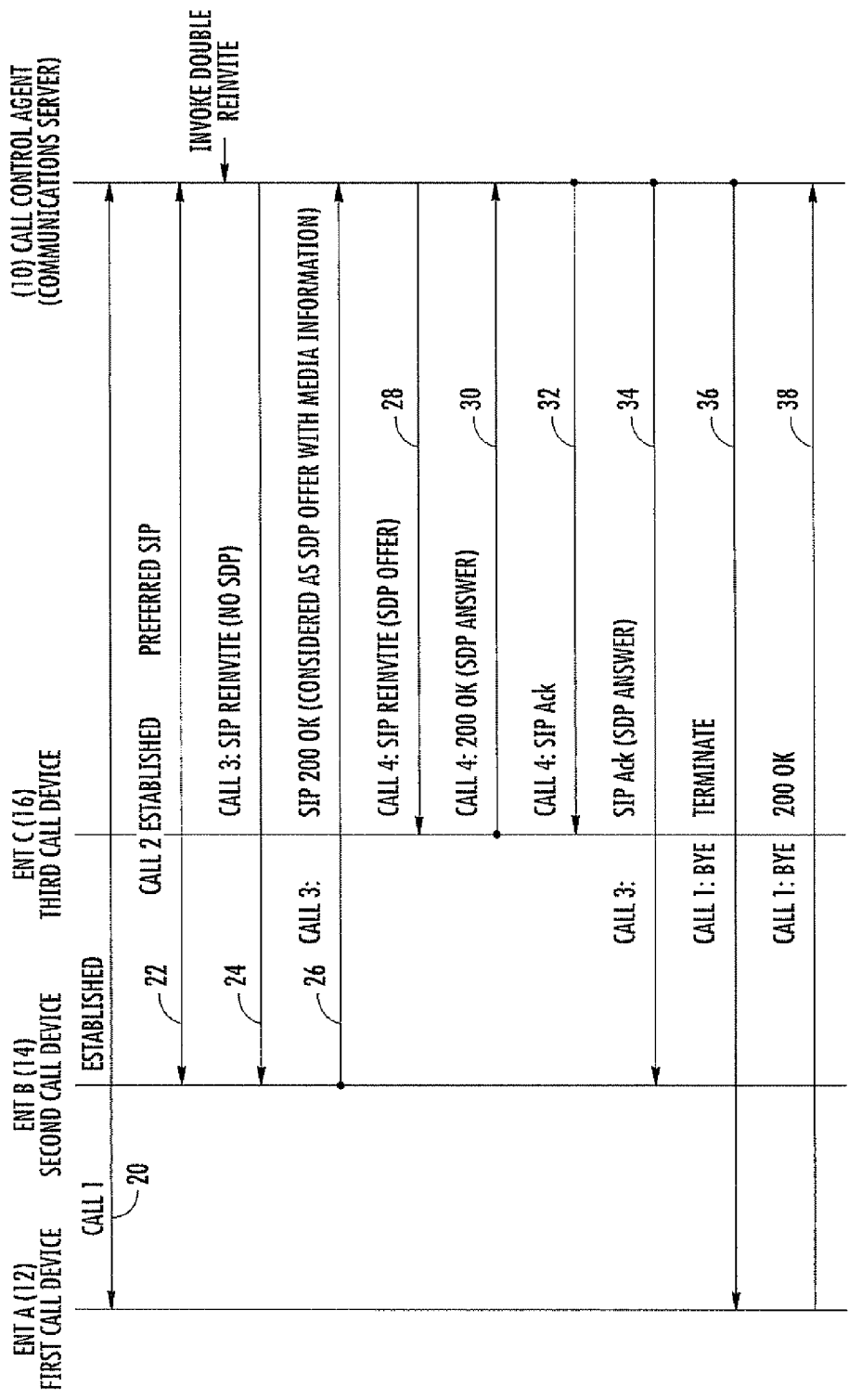
FIG. 1 is a sequence diagram for calls between a call control agent such as the communications server and first, second and third call devices and showing the sequence of the call routing mechanism in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example, the system and method allows call devices or other network devices such as Session Initiation Protocol (SIP) phones and an analog phone as a non-limiting example to participate in a form of call forking, for example, a ring group type application, with correct media after finding an answering party. The system and method allows for a SIP connection using any means to have a connected call with full media to be routed to another endpoint without SIP transfer methods not allowed on the wire. The system and method also allows for provision of ring-back on calls that were previously connected that have been redirected to a new endpoint without the use of SIP transfer methods and patch-up of the audio after the new endpoint connects.

The system and method, in accordance with a non-limiting example, solves these problems using a mechanism to reestablish media negotiation. In one aspect, it is referred to as a double Invite (Reinvite) and in effect will query or send an Invite (Reinvite) to one endpoint of a call with no SDP (Session Description Protocol), thus, gaining new and current media parameters for an official offer in a new Reinvite to the second endpoint of a call. Once the answer from the second endpoint to the current offer is received, the system and method sends the response to the first endpoint in the acknowledgement (ACK). The system uses standard SIP message characteristics to implement and avoid violations of RFC 3264 while not processing media. This system and method can be automatically invoked on all transfers and forwards within a device and manually provides the ring-back connection to the local media, which in one example is a Digital Signal Processor (DSP), but could be any source.

In some communications networks, a call control agent, for example, a communications server operative as a network switch, operates as a switchboard between first and second entities as call devices using Session Initiation Protocol (SIP) and the offer/answer model described in RFC 3264, the disclosure which is hereby incorporated by reference in its entirety. When initiating multi-media teleconferences, voice-over-IP (VoIP) calls, streaming video, or other media sessions, the media details, transport addresses and session description metadata are conveyed to participants using the Session Description Protocol (SDP) as the standard representation for this information. RFC 4566, the disclosure which is hereby incorporated by reference in its entirety, is the base standard for SDP. SDP is used irrespective of how that information is transported. SDP is a format for the session description, but does not incorporate any transport protocol. SDP conveys information about media streams in multi-media sessions to allow the recipients to participate in the session. SDP describes streaming media initialization parameters in an ASCII string in terms of a session announcement, session invitation, and parameter negotiation. It is a short, structured text description and conveys the name and purpose of the session and the media, protocols, CODEC formats, timing and transport information required for the session.

SIP is an application-layer control protocol that creates, modifies and terminates sessions. RFC 3261, the disclosure which is hereby incorporated by reference in its entirety, is the base standard for SIP. The SIP messages create sessions and carry session descriptions that allow participants to agree on a set of compatible media types. These session descriptions are typically formatted using SDP. When used with SIP, the offer/answer model as set forth in RFC 3264 provides the framework for negotiation using SDP, which includes a session name and purpose, the times the session is active, the media comprising the session, and the information used to receive those media, for example, the addresses, ports, and formats. Thus, two call devices such as a first call device as a first entity and a second call device as a second entity as described above use SDP to arrive at a common view of the multimedia session between them. In the offer/answer model, one entity offers the other entity a description of the desired session from their perspective, and the other entity answers with a desired session from their perspective. SIP uses this offer/answer model as its negotiation framework.

In the offer/answer model, a party indicates a desired session description from their point of view as the SDP offer, which contains the set of media streams the offerer wants to use, the desired characteristics of the media streams as qualified by a format parameter and media-line attributes, the IP addresses and ports where the offerer wants to receive the media, and additional parameters, if required, that qualify the media transport. The other party receives the offer and replies with an SDP answer accepting or rejecting the media stream. For example, if a media stream is not accepted, the port value in an m-line for media is set to zero. An answer typically includes the media stream's characteristics used for the session and the IP addresses and ports that the answerer wants to use to receive the media.

It should be understood, however, that sometimes the offer and answer is an "atomic" entity and there is one of each. In these instances, it is negotiated every time. It can use the same information as a previous offer/answer. There is still an active negotiation, however, in these instances. In some instances, a 183 preconnect with preliminary SDP answer can be received and then a final response can also be received with a final answer.

Figure 2:
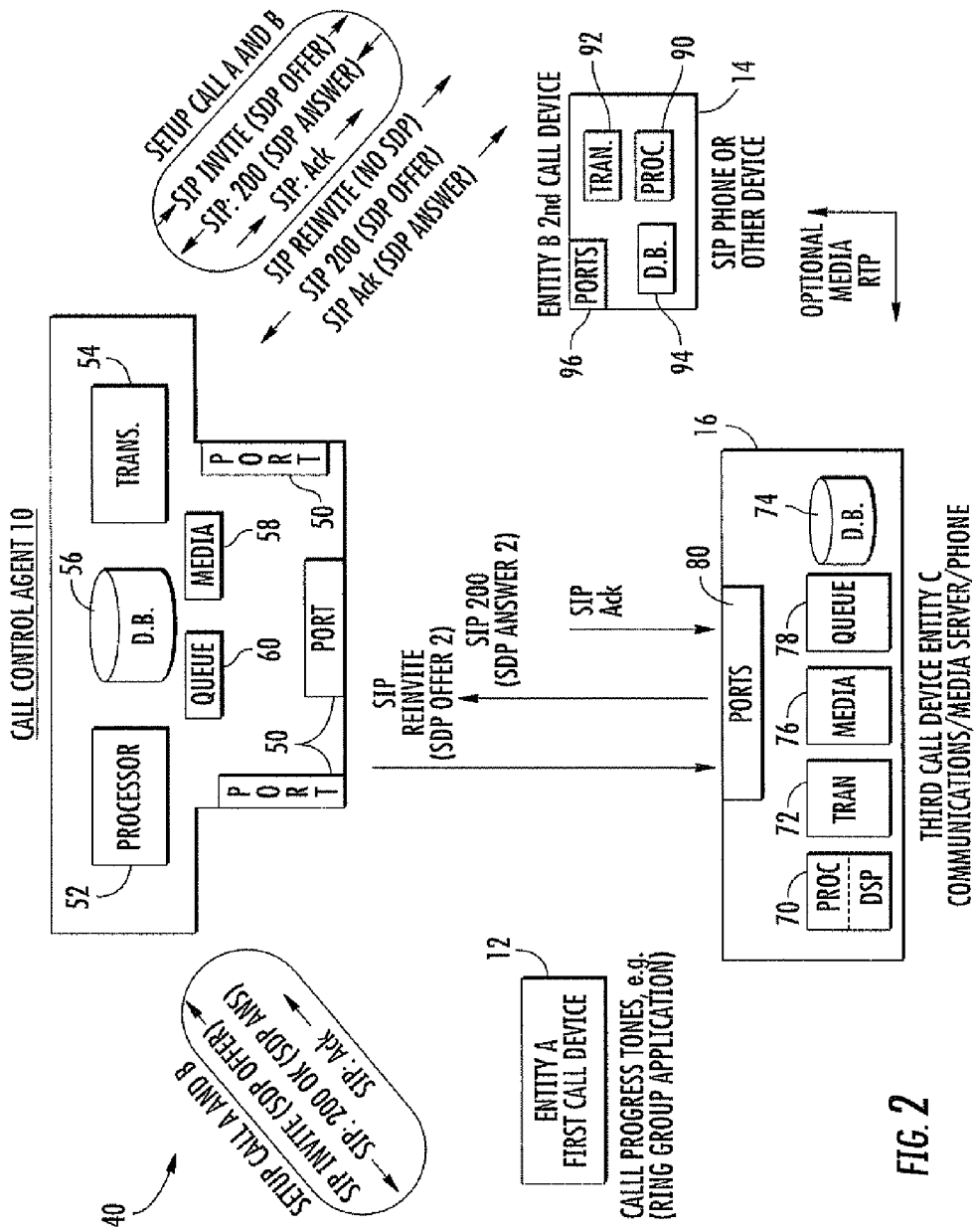
FIG. 2 is a high-level block diagram showing a communications system having a call control agent and first, second and third call devices through which the method and sequence shown in FIG. 1 can be applied in accordance with a non-limiting example.

In the example described, there is a call control agent 10 interconnected among first, second and third call devices 12, 14, 16 (first, second and third entities) such as shown in FIGS. 1 and 2. Of course, this example describes only three call devices, but any number of call devices as different entities can be used. Entity A as a first call device desires to transfer its call with Entity B as a second call device to Entity C as a third call device, such that Entity B will be talking to Entity C and not to Entity A. SIP provides many techniques for making this transfer. It is desirable using the system and method to be described that the transfer is not initiated by any type of messaging sent to Entity A. There is no interaction performed by Entity A to cause this transfer in accordance with a non-limiting example. It is also necessary to avoid violation of the offer/answer model described in RFC 3264 when changing the destination of the routed call. It is also necessary to maintain media end-to-end without the switch processing and the terminating and resending of media during the call to conserve wire and processing (CPU) bandwidth. It is also desirable to avoid the technical solution currently implemented by most switches that reuse the originally sent media parameters that may no longer be valid on the connection or may not provide the best bandwidth solution.

The system and method address different scenarios as non-limiting examples. The system and method allows SIP phones (and analog phones) to participate in call forking in a ring group type application with correct media after finding an answering party. In another example, the system and method allow for a SIP connection using any means to have a connected call with full media to be routed to another endpoint without SIP transfer methods not allowed on the wire. In another example, the system and method provisions ring-back on calls that were previously connected and had been redirected to a new endpoint without use of SIP transfer methods and patch-up of audio after the new endpoint connects.

FIG. 1 is an example of a sequence diagram for calls within a communications system between a call control agent 10 and Entity A as a first call device 12, Entity B as a second call device 14, and Entity C as a third call device 16 and discloses the mechanism that solves the technical problems described above. Media negotiation is reestablished to avoid violation of the offer/answer model described in RFC 3264 when changing the destination of the routed call among Entities A, B and C (12, 14 and 16). The system and method are referred to in this example as a "double Reinvite" (corresponding to a double use of the SIP Reinvite command in a defined manner). The system and method queries or sends a Reinvite to one endpoint of a call (corresponding to the second Entity B 14) with no SDP information, thus, gaining new and current media parameters for an official offer in a new Reinvite command to the second endpoint of a call corresponding to the third Entity C 16. When the system receives the second endpoint's answer to the current offer, the response to the first endpoint is sent in an acknowledgement (ACK). This system and method uses a standard SIP message to implement and avoid violations of RFC 3264 while not processing media. In a non-limiting example, this mechanism is automatically invoked with all transfers and forwards and manually provides a ring back connection to local media, such as a DSP. It could be any source, however. As illustrated in FIG. 1, the call is established as a SIP call between the call control agent 10 and first and second call devices 12, 14 and shown as call 1 and call 2 (20, 22). The call control agent then transmits a SIP Invite (Reinvite) as call 3 (24).

This SIP Reinvite acts to poll media information again when the call control agent 10 sends this Reinvite command without SDP to the second call device 14. The second entity 14 responds with the SIP 200 okay (OK) code as a message with media information (26). This becomes the SDP offer.

As noted before, call 1 (20) is established between Entity A as the first call device 12 and the call control agent 10. Call 2 (22) is established between Entity B as the second call device 14 and the call control agent 10 to establish the call between Entity A and Entity B using SIP. The call control agent 10 invokes the "double Reinvite" as explained above and with the sequence as shown in FIG. 1 and sends the SIP Reinvite command with no SDP to Entity B (24), which sends the SIP 200 OK that is considered the SDP offer with media information as current and new media parameters back to the call control agent 10 as part of call 3 (26). The call control agent 10 invokes call 4 with the SIP Reinvite 28 that is the SDP offer to Entity C as the third call device 16, which responds with the 200 OK as the SDP Answer for call 4 (30). The call control agent 10 acknowledges the call 4 with a SIP ACK to Entity C (32). The call control agent 10 sends the SIP ACK of call 3 for the SDP answer to Entity B (34). The call control agent 10 terminates call 1 with Entity A using the BYE command (36). Entity A sends the 200 OK as the answer for the BYE command to complete termination of the call (30).

In one example, there is a ring group with Entity A forking the call as part of the ring group to local entities, for example, Entity C. The secondary Invite (Reinvite) command as described above polls Entity B. It should be understood that Entity C is not necessarily another IP phone, but in one example, Entity C is a communications server as a media server and Entity B sends packets to Entity C and returns media calls.

In a non-limiting example, the call control agent 10 is a communications server that operates as a network switch including a carrier level soft switch. As to call 3 from Entity B 14 to the call control agent 10, this is an offer with SDP. Before this call is terminated, the call 4 to the new Entity C is started. Entity C responds with the call acceptance since it is an answer and acknowledges the call and uses the received answer in the acknowledgement of the previous call. As to call 3 with the SIP ACK for the SDP answer number 2 (34) for the system in the context of this call, it is considered a Reinvite and moves the media stream from communicating with Entity A to communicating with Entity C such as to not violate the offer/answer model. It accomplishes this by revising the information of the previous negotiation as requesting new information to revise to the new construct.

FIG. 2 is a block diagram showing further details of the call control agent 10, the first call device as Entity A 12, the second call device as Entity B 14, and the third call device as Entity C 16 and also showing the various SIP communications sequence between the call control agent and the first, second and third call devices as Entity A, Entity B and Entity C. The sequence shown in FIG. 2 tracks closely what is shown in the sequence of FIG. 1, but FIG. 2 shows further details of the various components that could be included as part of call control agent 10 and first, second and third call devices 12, 14 and 16.

The first call device, second call device, and third call device 12, 14, 16 can be at least one of an analog phone and SIP phone and part of an overall communications system 40. In a non-limiting example, the call control agent 10 is a communications server and includes communications ports 50 and a processor 52 and transceiver 54 that communicates and processes data packets for data communications and a database 56 for storing data. The communications server includes a media server 58 and processes media and other data and interoperates with other components. The media server 58 could be a separate component or separate application. A queue 60 is included in a non-limiting example and music can be transferred if any caller is held in queue using the Real-Time Transport Protocol (RTP), which defines a standardized packet format for delivering audio and video over the Internet. Thus, there could be queuing of calls. A communications server could be an Automatic Call Distributor and have Private Branch Exchange (PBX) capability.

In this non-limiting example, Entity C as the third call device is a communications server as a media server. This communications server as a media server includes components similar to these components of the call control agent 10, including a processor 70, transceiver 72, database 74, media server 76 as part of the processor 70 or a separate processor, a queue 78 and the various ports 80 as illustrated.

The second call device could be a SIP phone as illustrated and include a processor 90, transceiver 92, database 94 and ports 96. The first call device, in a non-limiting example, is a SIP phone, but could be another type of communications device. Some of the call devices can be an analog phone, such as the first call device. The call devices could interface with the call control agent through the same or different networks. It should be understood that the communications system and method described relative to FIGS. 1 and 2 could include Automatic Call Distributor and/or Private Branch Exchange (PBX) functionality and offer a feature for call pick-up that allows one user to retrieve a call destined to a remote user as a directed call or within a defined group of users as a group. When SIP phones are involved, the media stream in one example is negotiated in an end-to-end fashion without violation of the offer/answer model described in RFC 3264. The Reinvite process as described can also be used to communicate changes in media capabilities with the media servers. In alternative optional scenarios, it is possible to create a forwarded call from an initial calling party to a pick-up requester and use a ring type that allows the SIP phone to automatically go off-hook as a Hands-Free Auto Answer (HFAA) to retrieve the call either to the handset or speaker in a non-limiting example. The third call device as Entity C could be monitoring another call device.

SDP is a format typically used for describing the streaming media initialization parameter in an ASCII string. It describes the different multimedia communication sessions, including announcement and invitation and negotiation. SDP commands are used for negotiation between the endpoints of media types and not for communicating the data itself. The data is transported in a packet format in accordance with the Real-Time Transport Protocol (RTP). RTP is a standardized packet format for delivering audio and video over an internet and involves typically streaming media. The packets can carry media streams controlled by MGCP and H.323 and the Session Initiation Protocol (SIP) signaling protocols as examples. RTP allows end-to-end, real-time transfer of the multimedia data.

In RTP, the sequence number is typically 16 bits and increments by one for each RTP data packet while the timestamp reflects the sampling instant of the first octet in the RTP data packet. By implementing the session and delivering media to the user in a packet format, it is possible to reuse the same network socket as the source IP and port numbers and update RTP timestamps and sequence numbers and transfer the media to the user with minimal jitter buffer flushes and network resource usage when media transfer is desired.

The communications server as shown in FIG. 2 at the third call device can be "on the box," i.e., integrated with the communications server, instead of external to that device, but it could be external. This also applies for the media server with respect to the call control agent. It is possible that any timestamps and sequence numbers can be negotiated for packets. Any audio as media can pass through RTP streams with the updated sequence numbers and timestamps to make consecutive across any switchovers. It should be understood that buffering can be in the phone at the caller (phone).

In one non-limiting example, the system can integrate media servers to the communications server of a number of different media servers that are internal to the communications server. Thus, it is possible to use elements in C data structures passed as a message between internal media servers. When switching between media servers, the system passes the information about the last RTP packet sent to the caller by the previous media server. The system knows where the media server should start any of its timestamps and sequence numbers. The system passes the last RTP timestamp, sequence number and the real time of the last packet sent. Because it knows the actual time the last packet was sent, the new media server can determine how much to increment the last timestamp it was provided. Any sequence number is easier to deal with because it is simply incremented and does not have to take the passage of time involved in the switchover of media servers.

Figure 3:
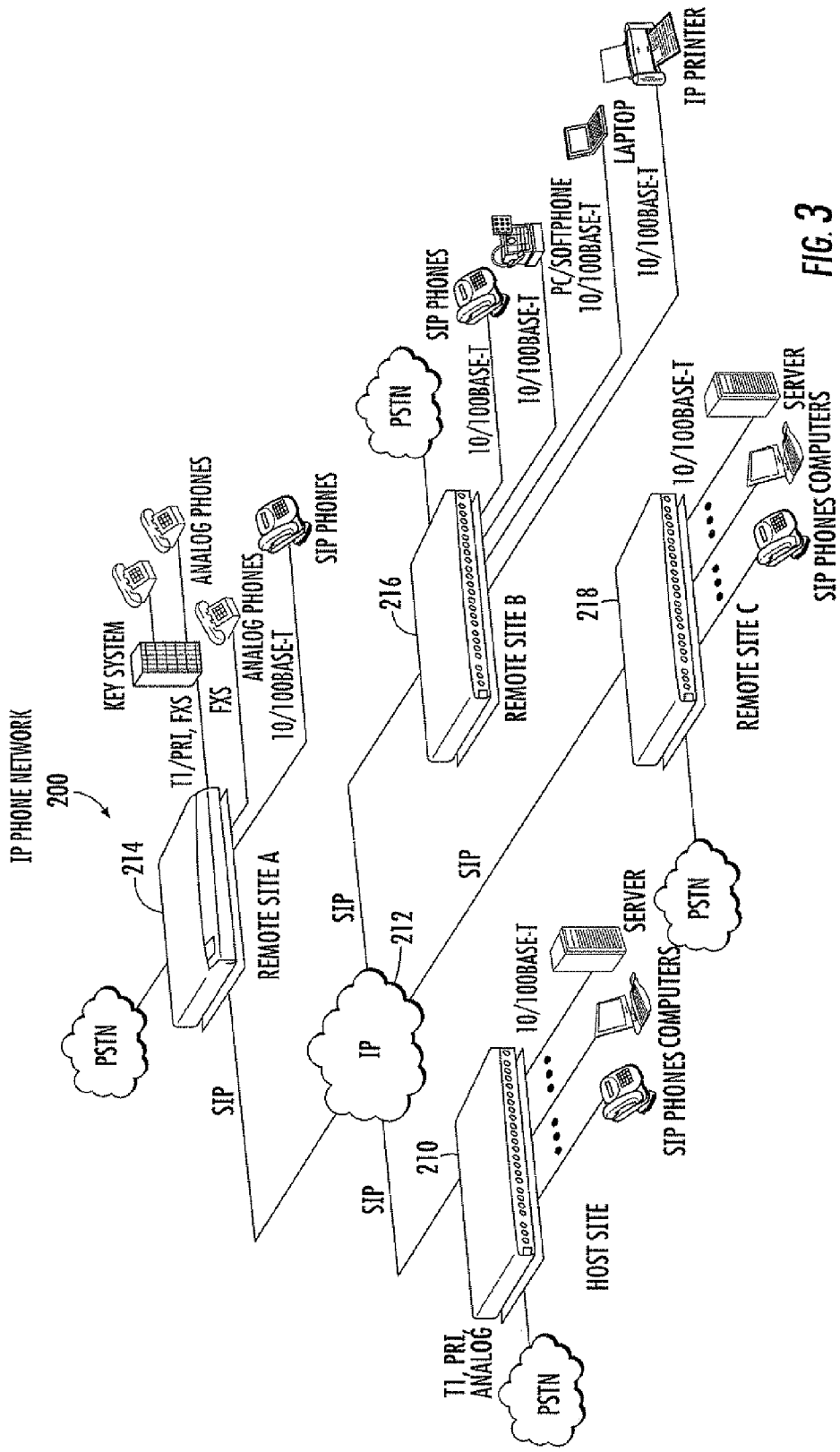
FIG. 3 is an example of a communications system that can use the method and sequence as described in FIG. 1 and incorporate components of the communications system shown in FIG. 2 in accordance with a non-limiting example.

There now follows a general description of a larger IP phone network as a general description to show a more specific and larger network example to which the example can be applied. FIG. 3 is a system diagram of an Internet Protocol (IP) telephone system 200 that includes various network components and devices as shown in FIG. 2 and other interconnected platforms, switches and servers. It should be understood that the system 200 shown in FIG. 3 is only one non-limiting example of an IP telephone system that uses an example network device as communications server 210 for different functions, including a switch. This series of devices can include a NetVanta 7000 or 7100 device as manufactured by ADTRAN, INC. of Huntsville, Ala. In one aspect, the NetVanta 7100 is a communications server as an all-in-one office-in-a-box that provides voice and data solutions, including Private Branch Exchange (PBX) functionality.

FIG. 3 shows the communications server 210 (such as the NetVanta series 7000/7100) connected to an IP network 212, which uses SIP communications to various remote sites (A-C), which each include other devices that could operates as a communications server. Each of the remote sites includes a network device 214, 216, 218 of remote sites A, B and C respectively, that operate as communications servers such as IP business gateways. For example, remote site A could include an IP gateway device 214 such as the Total Access 900 manufactured by ADTRAN, INC. of Huntsville, Ala. Remote site B could include a NetVanta 6355 as an IP gateway device 216. Remote site C could include another communications device 218 similar to that at the host site, which includes a NetVanta 7100 device. These are only examples for purposes of description. All of these communications devices operate as network switches and include other functionality. For example, the device 214 at remote site A connects to a key system and various analog phones through a communications system and a SIP phone. The device at remote site A also connects to a PSTN. The device 216 at remote site B connects to the PSTN and a SIP phone, a PC/soft phone, a laptop and an IP printer as illustrated in that network. The device 218 at remote site C connects to the PSTN and a SIP phone, a computer and a server. The host site connects to the PSTN and also SIP phones, computers and a server through various communications connections and ports as illustrated.

There now follows a more detailed description of the communications server 210 as shown at the host site and described as a NetVanta 7000 series, and in this particular example, as a NetVanta 7100 for purposes of general understanding and description. This description can apply to other devices at the other remote sites.

In this device as the communications server 210, a single chassis can provide a LAN-to-WAN infrastructure and Quality of Service (QoS) that maintains voice quality and includes a Graphical User Interface (GUI) for network set-up and facilitate installation and system administration.

In this example, this communications server can allow a converged IP voice and data network with a full-function IP PBX for voice. It can include an integrated Power Over Ethernet (POE) switch-router for data in an integrated device and a Virtual Private Network (VPN) for secure Internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules could include T1 and ADSL Network Interface Modules (NIMs). Analog (FXS, FXO) Voice Interface Modules (VIMs) can be included with T1, PRI voice interface modules and fiber SFP modules.

The communications server 210 in this example is an integrated communications platform and includes capability of a fast Ethernet switch with Gigabit uplinks and expansion slots for the network interface modules and voice interface modules. The IP telephone system 200 as illustrated includes voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. The device can operate as an integral SIP gateway with the appropriate FXS and FXO analog interfaces to support analog phones, fax machines, modems and credit card readers. The integrated voice mail can include 3,000 messages on eight ports and multi-level auto-attendant that are multi-level on eight ports in the example of the NetVanta 7000 series. The device includes, in one example, a full function IP access router and an integrated state inspection firewall protects against the Denial-of-Service (DOS) attempts. The devices include IP Sec VPN and tunnelling with DES/3DES/AES encryption and a SIP-aware firewall, and include T.38 support and a door relay, music-on-hold (MOH) interfaces and Voice Quality Monitoring (VQM).

SIP networking is supported between multiple locations such that a business can connect multiple sites and have three or four digit dialing and local call routing and survivability and on-net calls for toll bypass. Multiple SIP trunks allow one communications server to connect to other communication servers, such as a Total Access series device as manufactured by ADTRAN, INC. Up to ten or more remote SIP trunks can be supported and connect to all endpoints at all locations such that a user can have local voice mail and auto-attendant services. A hub and spoke SIP network can be accomplished in another example. A dedicated communications server such as shown in FIG. 2 and also used in the IP phone system of FIG. 2 can aggregate SIP trunks at a central location, which for qualified applications, increases the number of other communication servers that can be networked together.

The user can use an Internet Protocol (IP) phone such as an IP 700 series of telephones with six or twelve line versions and support multiple call functions. It is possible to incorporate voice mail-to-email applications and personal auto-attendant in which each phone sets up their own automatic attendant. It is also possible for the communications server to ring a series of stations and one external phone number. The server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for the communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of routing a call comprising:
    establishing, by a call control agent, a first Session Initiation Protocol (SIP) communications session call between a first communications endpoint and a second communications endpoint;
    sending, by the call control agent and to the second communications endpoint, a SIP Reinvite command that does not include Session Description Protocol (SDP) media parameters to gain current media parameters from the second communications endpoint, wherein the SIP Reinvite command is sent to the second device independent of the call control agent receiving the SIP Reinvite from another communications endpoint;
    receiving, by the call control agent and in response to the SIP Reinvite command, current media parameters of the first SIP communications session call from the second communications endpoint;
    sending, by the call control agent and to a third communications endpoint that is not included in the first SIP communications session call, an SDP offer that includes the current media parameters of the first SIP communications session call between the first communications endpoint and the second communications endpoint;
    receiving, by the call control agent and from the third communications endpoint, an SDP answer to the SDP offer; and
    in response to receiving the SDP answer from the third communications endpoint:
    establishing, by the call control agent, a second SIP communications session call between the second communications endpoint and the third communications endpoint based, at least in part, on the current media parameters of the first SIP communications session call between the first communications endpoint and the second communications endpoint; and
    terminating the first communications session call with the first communications endpoint while maintaining a media stream between the second communications endpoint and third communications endpoint.

2. The method according to claim 1, and further comprising changing the destination of the call and maintaining any media stream between the second and third communications endpoints without violating the offer/answer model of negotiation using SDP.

3. The method according to claim 1, and further comprising changing the destination of the call and maintaining any media stream between the second and third communications endpoints without any interaction from the first communications endpoint.

4. The method according to claim 1, and further comprising allowing a ring-back on calls that were previously connected that have been redirected to a new communications endpoint as the third communications endpoint without use of SIP transfer methods and patch up audio after the new communications endpoint connects.

5. The method according to claim 1, and further comprising arranging the communications endpoints together as a call progress tones application.

6. The method according to claim 1, and further comprising forming at least one of the communications endpoints as an analog phone.

7. The method according to claim 1, and further comprising forming at least one of the communications endpoints as a SIP phone.

8. A method of routing a call comprising:
    establishing, through a call control agent, a first Session Initiation Protocol (SIP) call between a first communications endpoint and a second communications endpoint arranged in a call progress tones application;
    sending, from the call control agent and to the second communications endpoint a SIP Reinvite command Session Description Protocol (SDP) media parameters to gain current media parameters from the second communications endpoint, wherein the SIP Reinvite command is sent to the second communications endpoint independent of the call control agent receiving the SIP Reinvite from another communications endpoint;

receiving, by the call control agent and in response to the SIP Reinvite command current media parameters of the first SIP call from the second communications endpoint;

sending, from the call control agent to a third communications endpoint that is not included in the first SIP call, and as part of a ring group application, an SDP offer using current media parameters;

receiving, by the call control agent and from the third communications endpoint, an SDP answer to the first SDP offer;

in response to receiving the SDP answer from the third communications endpoint:

establishing, by the call control agent, a second SIP call between the second communications endpoint and the third communications endpoint based, at least in part, on the current media parameters of the first SIP call; and terminating the first SIP call with the first communications endpoint while maintaining a media stream between the second communications endpoint and the third communications endpoint.

9. The method according to claim 8, and further comprising forming the call control agent as a communications server operative as a network switching device.

10. The method according to claim 8, and further comprising changing the destination of the call and maintaining any media stream between the second and third communications endpoints without violating the offer/answer model of negotiation using SDP.

11. The method according to claim 8, and further comprising changing the destination of the call and maintaining any media stream between the second and third communications endpoints without any interaction from the first communications endpoint.

12. The method according to claim 8, and further comprising allowing a ring-back on calls that were previously connected that have been redirected to a new communications endpoint as the third communications endpoint without use of SIP transfer methods and patch up audio after the new communications endpoint connects.

13. The method according to claim 8, and further comprising forming at least one of the communications endpoints as an analog phone.

14. The method according to claim 8, and further comprising forming at last one of the communications endpoints as a SIP phone.

15. A communications system, comprising:

a call control agent interconnected among a plurality of communications endpoints comprising first, second and third communications endpoints, and comprising a processor and transceiver configured to establish a Session Initiation Protocol (SIP) call between the first and second communications endpoints, said call control agent configured to send to the second communications endpoint a SIP Reinvite command that does not include Session Description Protocol (SDP) media parameters to gain current media parameters from the second communications endpoint, wherein the SIP Reinvite command is sent to the second communications endpoint independent of the call control agent receiving the SIP Reinvite from another communications endpoint;

wherein:

the third communications endpoint is not included in the SIP call;

the second call communications endpoint comprises a processor and transceiver and is configured to provide current media parameters to the call control agent in response to the SIP Reinvite command;

the call control agent is configured to receive the current media parameters from the second communications endpoint and send, to the third communications endpoint, an SDP offer using the current media parameters the third communications endpoint comprises a processor and transceiver and is configured to provide an SDP answer to the SDP offer; and the call control agent is configured to establish a second SIP call between the second device and the third communications endpoint based, at least in part, on the current media parameters and configured to terminate the call with the first communications endpoint while maintaining a media stream between the second communications endpoint and third communications endpoint.

16. The system according to claim 15, wherein said call control agent comprises a communications server configured as a network switching device.

17. The system according to claim 15, wherein said call control agent is configured to change the destination of the call and maintain any media stream between the second and third communications endpoints without violating the offer/answer model of negotiation using SDP.

18. The system according to claim 15, wherein said call control agent is configured to change the destination of the call and maintain any media stream between the second and third communications endpoints without any interaction from the first call device.

19. The system according to claim 15, wherein at least one of said first, second or third communications endpoints comprise at least one of an analog phone.

20. The system according to claim 15, wherein at least one of said first, second and third communications endpoints comprise at least one of a SIP phone.

21. The system according to claim 15, wherein said first, second and third communications endpoints are configured in a call progress tones application.

22. The system according to claim 15, wherein said first, second and third devices are configured for ring-back on calls that were previously connected that have been redirected to a new communications endpoint as the third communications endpoint without use of SIP transfer methods and patch up audio after the new endpoint connects.

* * * * *